United States Patent [19]
Baker et al.

[11] Patent Number: 5,712,764
[45] Date of Patent: Jan. 27, 1998

[54] APPARATUS AND METHOD OF ASSEMBLING VEHICLE INSTRUMENT PANEL STRUCTURAL AND ELECTRONIC COMPONENTS

[75] Inventors: Jay DeAvis Baker, West Bloomfield; Lawrence Leroy Kneisel, Novi; Myron Lemecha, Dearborn, all of Mich.

[73] Assignee: Ford Motor Company, Dearborn, Mich.

[21] Appl. No.: 642,723

[22] Filed: May 3, 1996

[51] Int. Cl.[6] .................................. H05K 7/20
[52] U.S. Cl. .................. 361/690; 180/90; 296/208; 361/627; 454/127
[58] Field of Search .................... 165/80.3, 122, 165/126; 296/70, 208; 180/90; 174/70 C, 72 A, 254, 35 R, 35 GC; 307/9.1, 10.1; 439/34; 454/127, 152; 361/600, 601, 627, 689, 690, 691, 694–697, 717–720, 749, 775, 816, 818

[56] References Cited

U.S. PATENT DOCUMENTS

| | | | |
|---|---|---|---|
| 2,825,038 | 2/1958 | Woofter | 339/17 |
| 2,847,560 | 8/1958 | Peak et al. | 240/8.16 |
| 2,923,860 | 2/1960 | Miller | 317/101 |
| 3,015,718 | 1/1962 | Petri | 240/8.16 |
| 3,042,137 | 7/1962 | Mathues et al. | 180/90 |
| 3,088,539 | 5/1963 | Mathues et al. | 180/90 |
| 3,174,576 | 3/1965 | Woofter et al. | 180/90 |
| 3,270,831 | 9/1966 | Woofter et al. | 180/90 |
| 3,590,136 | 6/1971 | Kunishi et al. | 174/50 |
| 4,194,585 | 3/1980 | Prince | 180/90 |
| 4,293,843 | 10/1981 | Bertoloni et al. | 340/52 F |
| 4,360,241 | 11/1982 | Fukunaga | 339/10 |
| 4,360,858 | 11/1982 | Fahling | 361/380 |
| 4,403,818 | 9/1983 | Kleinböhl | 339/10 |
| 4,522,114 | 6/1985 | Matsuno | 98/2.09 |
| 4,597,461 | 7/1986 | Köchy et al. | 180/90 |
| 4,706,810 | 11/1987 | Petrilli | 206/320 |
| 4,733,739 | 3/1988 | Lorenz et al. | 180/90 |
| 4,750,087 | 6/1988 | Carpenter et al. | 361/383 |
| 4,848,829 | 7/1989 | Kidd | 296/152 |
| 4,869,670 | 9/1989 | Ueda et al. | 439/34 |
| 4,910,641 | 3/1990 | Yanase | 361/364 |
| 4,924,957 | 5/1990 | Gigla | 180/90 |
| 4,929,182 | 5/1990 | Hyogo et al. | 439/34 |
| 4,942,499 | 7/1990 | Shibata et al. | 361/428 |
| 4,943,241 | 7/1990 | Watanabe et al. | 439/34 |
| 4,950,168 | 8/1990 | Watanabe et al. | 439/34 |
| 5,005,898 | 4/1991 | Benedetto et al. | 296/194 |
| 5,063,476 | 11/1991 | Hamadah et al. | 361/384 |
| 5,088,571 | 2/1992 | Burry et al. | 180/90 |
| 5,218,513 | 6/1993 | Brown | 361/384 |
| 5,255,155 | 10/1993 | Sugimoto et al. | 361/749 |
| 5,297,334 | 3/1994 | Johnson | 29/861 |

(List continued on next page.)

FOREIGN PATENT DOCUMENTS

| | | |
|---|---|---|
| 0687765 | 6/1964 | Canada. |
| 1266952 | 6/1961 | France. |
| 3017053 | 11/1981 | Germany. |
| 58-156437 | 9/1983 | Japan. |
| 4-266537 | 9/1992 | Japan. |
| 0859047 | 1/1961 | United Kingdom. |
| 1240789 | 7/1971 | United Kingdom. |
| 2166603 | 5/1986 | United Kingdom. |

OTHER PUBLICATIONS

Janicki, Greg, "Electronic Complexity Falls Under Close Scrutiny", Automotive & Transportation Interiors, Apr., 1995, pp. 18–21.

Primary Examiner—Gerald P. Tolin
Attorney, Agent, or Firm—Paul K. Godwin; Roger L. May

[57] ABSTRACT

An apparatus and method of assembling vehicle instrument panel structural and electronic components includes: 1) fabricating an insulative instrument panel base substrate; 2) applying a conductive pattern to the base substrate; and 3) attaching electronic components to the base substrate in electrical communication with the conductive pattern.

6 Claims, 6 Drawing Sheets

U.S. PATENT DOCUMENTS

| | | | |
|---|---|---|---|
| 5,309,634 | 5/1994 | Van Order et al. | 29/863 |
| 5,311,960 | 5/1994 | Kukainis et al. | 180/90 |
| 5,324,203 | 6/1994 | Sano et al. | 439/34 |
| 5,353,190 | 10/1994 | Nakayama et al. | 361/647 |
| 5,358,300 | 10/1994 | Gray | 296/192 |
| 5,364,159 | 11/1994 | Kelman et al. | 296/192 |
| 5,370,417 | 12/1994 | Kelman et al. | 280/751 |
| 5,556,153 | 9/1996 | Kelman | 296/70 |

APPARATUS AND METHOD OF ASSEMBLING VEHICLE INSTRUMENT PANEL STRUCTURAL AND ELECTRONIC COMPONENTS

TECHNICAL FIELD

The present invention relates to a method and apparatus for securing electronic devices in a vehicle and, more particularly, to a method and apparatus for securing a conductive pattern with electronic components and integral connectors to a base substrate and use of climate control features for thermal dissipation.

BACKGROUND OF THE INVENTION

Typically, electronic devices stored beneath a vehicle instrument panel are mounted on a thin substrate (circuit board) enclosed within a metal box or housing having bundles of wires (wiring harness) running into and out of the metal box. The metal box must be mounted to a support structure beneath the instrument panel and supported in an appropriate position, preferably behind the center stack bezel of the instrument panel for providing electronic support to the vehicle temperature control and sound systems, as well as other electronic instrument panel components, such as the anti-lock brake module, engine control module, air bag module, etc.

This assembly can consume a substantial amount of space beneath the instrument panel. The bulky metal box with bundles of wires extending therefrom will have substantial space requirements, and will adversely affect packaging design efficiency in the vehicle. Furthermore, the metal box increases manufacturing costs and vehicle weight.

Figure 1:
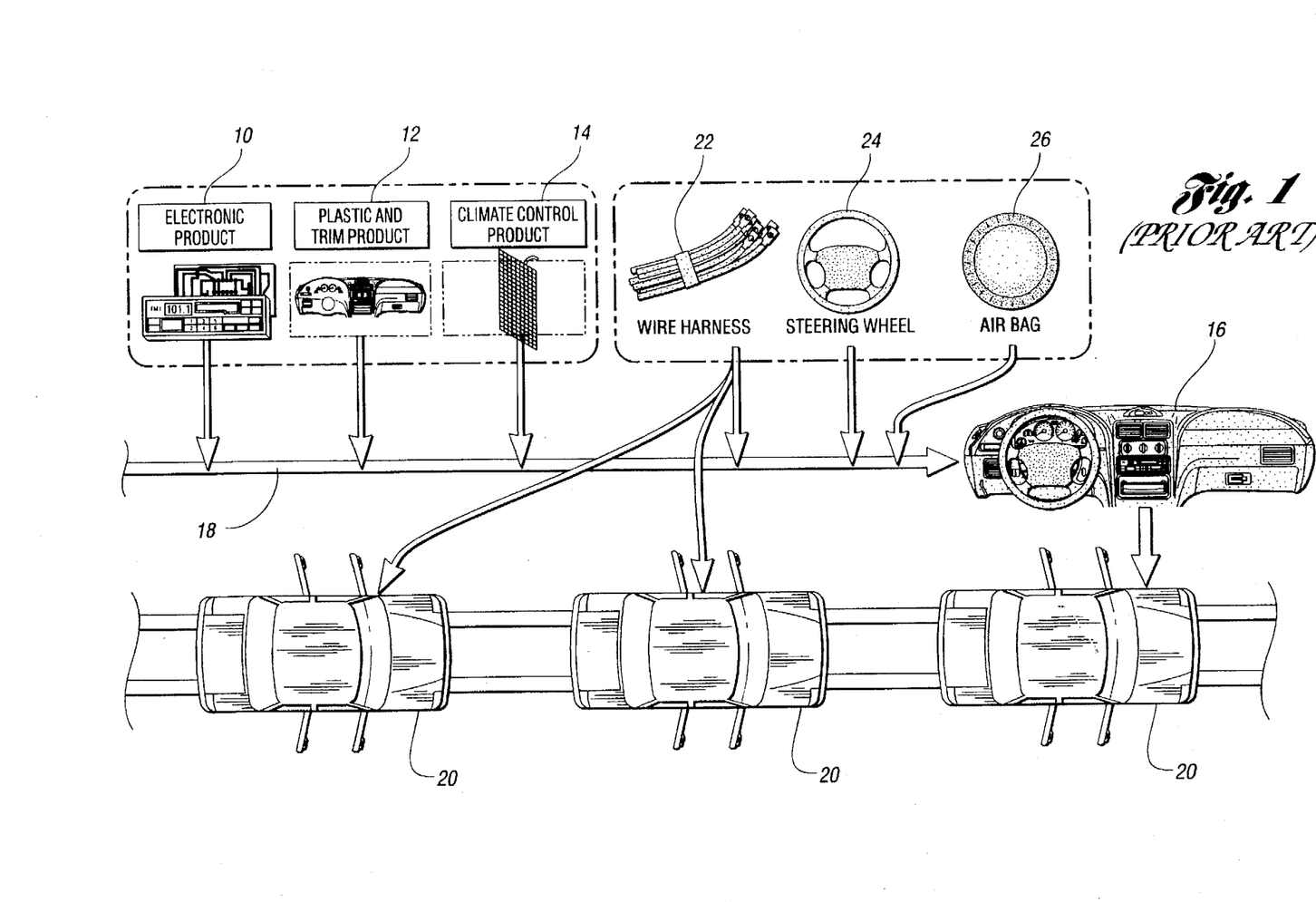
FIG. 1 is a schematic illustration of an instrument panel assembly process in accordance with the prior art.

A prior art instrument panel manufacturing assembly process is illustrated in FIG. 1. As shown, the electronic product 10, plastic substrate product 12, and climate control product 14 are separately installed into the instrument panel 16 along the instrument panel subassembly line 18 prior to installation of the instrument panel in the vehicle 20. Wiring harnesses 22, including bulky connectors, are installed both into the instrument panel at the subassembly line, and into the vehicle prior to installation of the instrument panel 16 into the vehicle 20. The steering wheel 24 and air bag 26 are also installed in the instrument panel 16 at the subassembly line prior to installation of the instrument panel into the vehicle. As illustrated, this assembly process requires a variety of different steps in assembling the various instrument panel components within the instrument panel, and then assembling the instrument panel into the vehicle. Further, it requires installation of wire harnesses within the vehicle and within the instrument panel subassembly prior to installation of the subassembly into the vehicle.

It is desirable to provide a method and apparatus for integrating assembly of structural and electronic components in a vehicle instrument panel in a manner in which packaging efficiency is improved, and manufacturing time, manufacturing costs, and weight are reduced.

DISCLOSURE OF THE INVENTION

The present invention overcomes the above-referenced shortcomings of prior art methods by providing an integrated manufacturing system in which the electronic devices, plastic instrument panel support structure, and climate control products are combined such that the assembly process is streamlined while packaging efficiency is improved, thermal dissipation is enhanced, and costs are reduced.

More specifically, the present invention provides a method of assembling vehicle instrument panel structural and electronic components, comprising: 1) fabricating an electrically insulative base substrate as a component of the vehicle instrument panel; 2) applying a conductive pattern to the base substrate; and 3) attaching electronic components to the base substrate in electrical communication with the conductive pattern.

Also provided is an apparatus for supporting electronic devices with respect to a vehicle instrument panel. The apparatus comprises a plastic instrument panel substrate, such as a ventilation duct or plastic instrument panel support structure, with a conductive pattern applied directly thereon. The conductive pattern includes a plurality of circuit traces connected by a "bus", or central signal and power distribution and interconnection system, as well as flat electrical connectors. A plurality of electronic components are secured in electrical communication with the conductive pattern and supported by the substrate.

In a preferred embodiment, the plastic substrate comprises a plastic ventilation duct. In other embodiments, the base substrate could be a cross-car beam coated with an electrically insulating layer, or it could be another existing vehicle structural or functional component, not limited to instrument panel components.

Accordingly, an object of the present invention is to provide an improved method and apparatus for supporting electronic devices in an instrument panel assembly in a manner in which packaging efficiency is improved and manufacturing costs are reduced as a result of streamlined assembly.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 2:
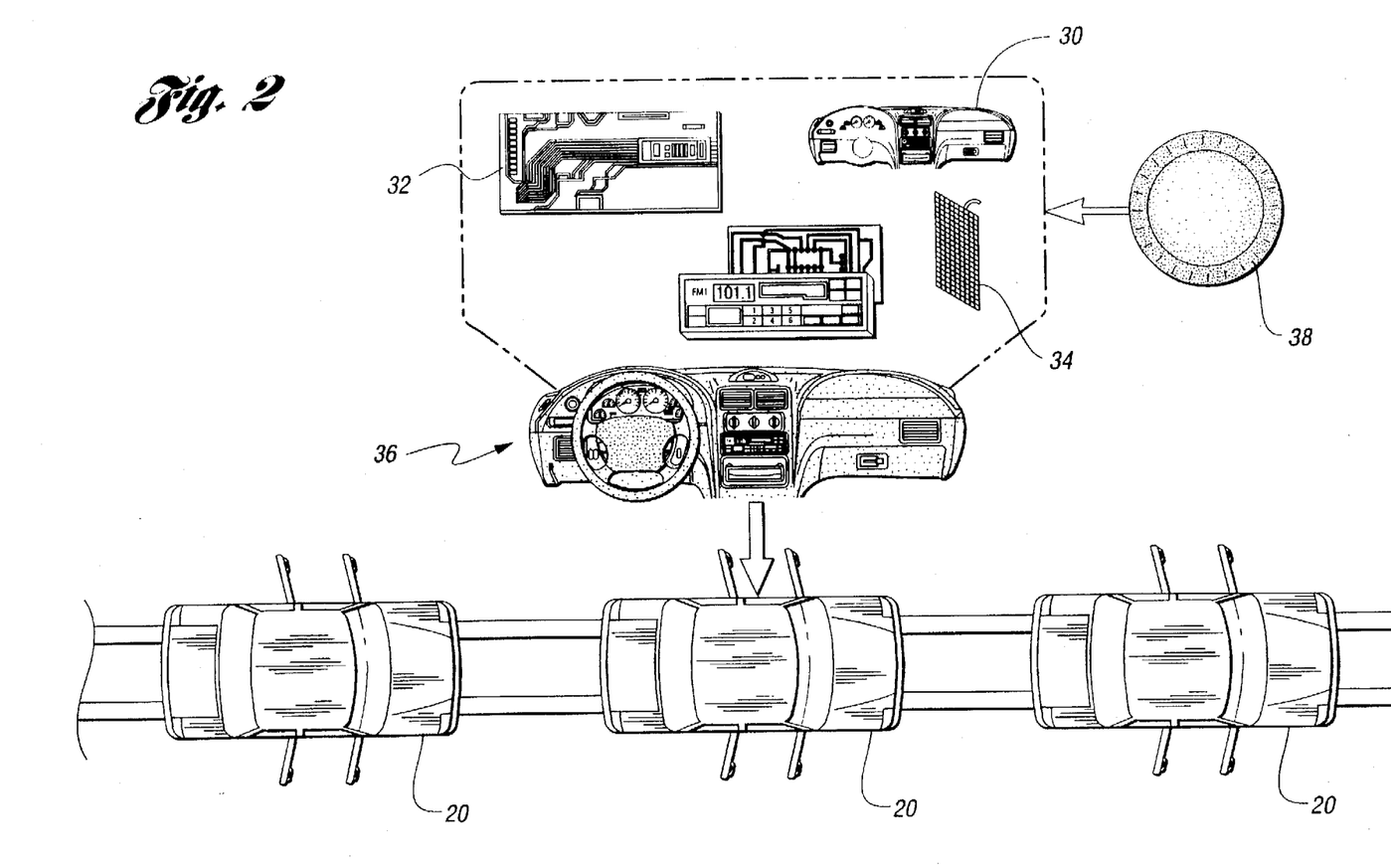
FIG. 2 is a schematic illustration of an integrated instrument panel assembly process in accordance with the present invention.

A method of assembling vehicle instrument panel structural and electronic components is illustrated schematically in FIG. 2 in accordance with the present invention. The method comprises combining the instrument panel base substrate 30, electronics 32, and climate control products 34 into an integrated instrument panel assembly 36. The air bag 38 is then installed in the instrument panel 36 prior to assembly in the vehicle 20.

This functionally integrated instrument panel configuration provides an assembly in which electrical, mechanical, thermal management, and electronic functions traditionally provided using many separate components are combined and integrated. By combining various plastics and electronics fabrication technologies, such as plastics molding, plating, and etching, features such as structural support, electrical circuits and connectors, housings, and component attachments can be integrated into the basic construction of a single component. Because of the various designs three-dimensional molded circuitry can take, circuitry and interconnections become integrated into the subsystem assembly infrastructure. Designers can integrate electronics with plastics to reduce cost, size and parts count, while increasing reliability and facilitating manufacturability.

The functionally integrated instrument panel 36 includes at least one electronics "bus" substrate, such as the instrument panel base substrate 30, which permits interconnection of electrical/electronic components within the instrument panel without using traditional wire harnesses and associated connectors. The instrument panel base substrate 30 is configured to support the "bus", or central signal and power interconnection and distribution system. The instrument panel bus substrate incorporates required electrical conductors as part of its basic construction, and may be fabricated as an integral part of existing instrument panel structural/functional components, or as a separate component. It allows direct connection of electronic components and modules at distributed locations throughout the instrument panel without the use of intervening wire harnesses or connectors. The substrate 30 may be non-planar, allowing conductor routing and component attachments in three dimensions. Circuit patterns of current electronic modules may also be incorporated in the instrument panel substrate 30 as part of its basic construction, thus eliminating the need for separate circuit boards, connectors, module housing components, bracketry, and fasteners. By enabling direct connection of formerly separate electronic modules and components, the instrument panel bus allows redundant conductors to be eliminated and enables sharing of electronic functions among modules, such as shared power supplies, EMC protection, grounding features, etc. Also, the bulky connectors associated with prior art wire harnesses are eliminated.

When the instrument panel bus substrate is appropriately designed as an integral part of vehicle structural/functional components, or when suitably attached to these components, improved electronics thermal management strategies can be implemented. For example, a cross car beam or other structural component could double as a heat sink, thus eliminating the need for a separate module heat sink and associated hardware. Similar benefits could be attained by integration of the bus substrate with climate control subsystem duct work, HVAC units, or blower assemblies.

The instrument panel bus substrate may be fabricated using a variety of manufacturing techniques, depending on the level of integration desired and materials selected. More specifically, a method of assembling vehicle instrument panel structural and electronic components in accordance with the present invention comprises the following steps: 1) fabricating a plastic base substrate as an instrument panel component; 2) applying a conductive pattern to the base substrate; and 3) attaching electronic components to the base substrate in electrical communication with the conductive pattern.

The base substrate may be fabricated of a variety of polymer materials and may be formed by standard polymer processing, such as injection molding, thermoforming, or blow molding, in the same manner as current instrument panel structural/functional parts. The base substrate, as previously described, need not be a polymer—it need only be insulative and combined with an existing vehicle functional or structural component. Other features of the base substrate would be grounding capacity, heat sink and thermal management capacity. For example, a cross-car beam would act as a base substrate if coated with an insulating layer such that it could support the circuit pattern, which could optionally be provided on a plastic support layer over the adhesive.

The step of applying a conductive pattern to the base substrate can be accomplished using a wide variety of fabrication techniques. The first option would be electroless or electrolytic plating wherein the circuit traces are plated onto the plastic from a liquid solution. Embossing is another option in which copper foil is placed over appropriate tooling, and heat and pressure are applied to cut out the conductive pattern and secure the conductive pattern to the plastic substrate. Ultrasonic embedding is another option in which copper wire is ultrasonically vibrated in contact with the plastic substrate, and melted to form the circuit trace as the tooling head moves around the substrate. A broad array of different wires could be used in this particular application. A further option is in-molding, in which a flexible film circuit is placed into a mold, and the molten plastic is injected into the mold such that the circuit is molded into the substrate. A further option would be to heat stake the conductive pattern onto the substrate surface.

The step of attaching electronic components can be accomplished by techniques identical or similar to those used in standard circuit board assembly. A preferred method would be to deposit solder paste onto the circuit pattern through a screen or stencil and reflow the solder for attachment of the components after the components are robotically placed in position. Alternatively, conductive adhesives could be used in which an adhesive includes metal particles for creating electrical flow paths through the adhesive. Further alternatives include mechanical press-fit connections or interlocking features, such as a through-hole in which a needle eye-type configuration creates a spring load for securing the components to the substrate.

Figure 3:
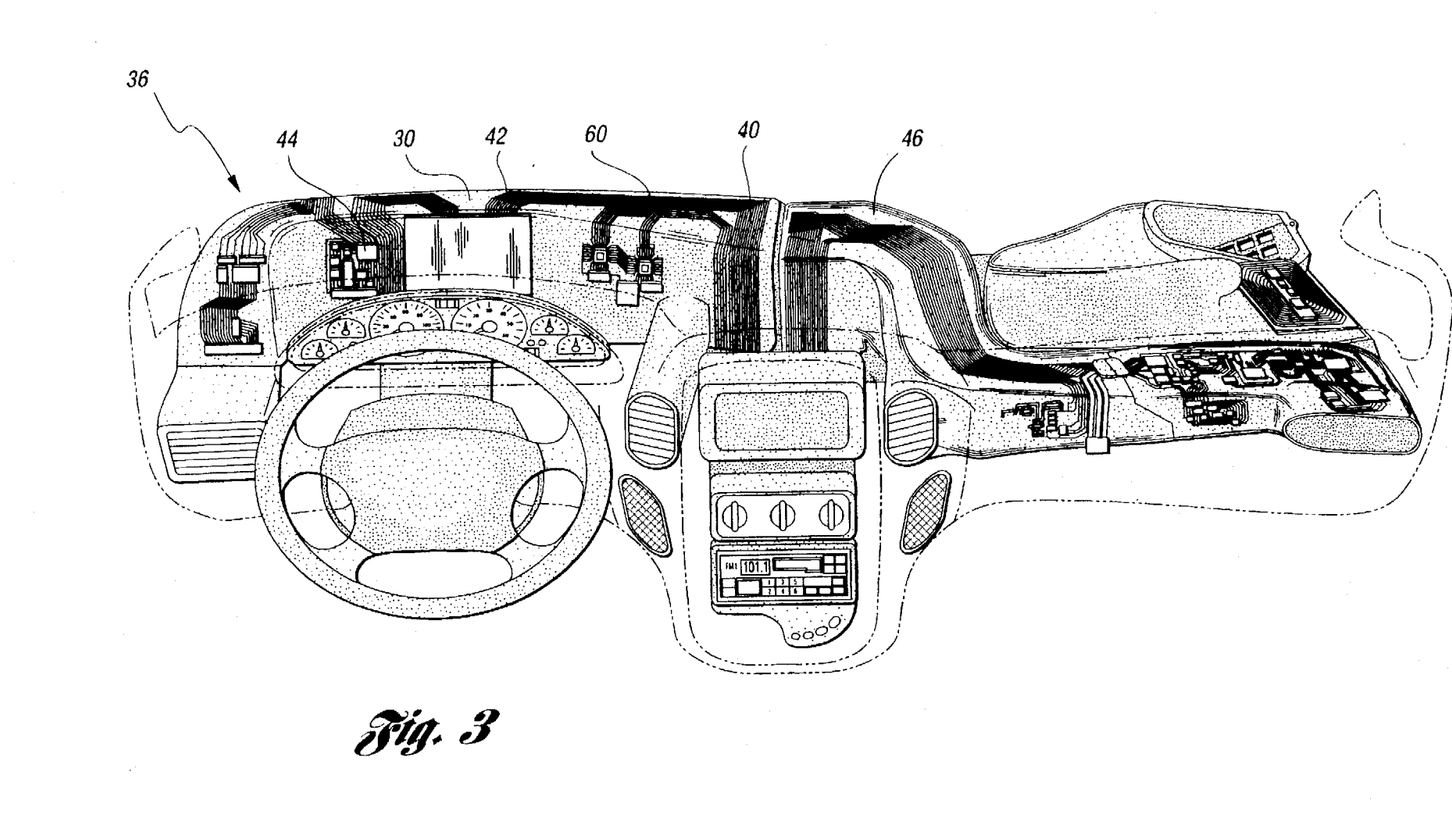
FIG. 3 shows a perspective view of an instrument panel assembly in accordance with the present invention.

FIG. 3 illustrates a preferred embodiment of a fully integrated instrument panel assembly 36 in accordance with the present invention. As shown, the instrument panel base substrate 30 has mounted thereon a conductive pattern 40 comprising bus 60 interconnected with a plurality of circuit traces 42 which are attached to the substrate 30. Electronic devices 44 are secured to the conductive pattern 40 in various locations across the substrate 30. FIG. 3 also shows a ventilation duct 46 which is operative as a base substrate for supporting a conductive pattern thereon.

Figure 4:
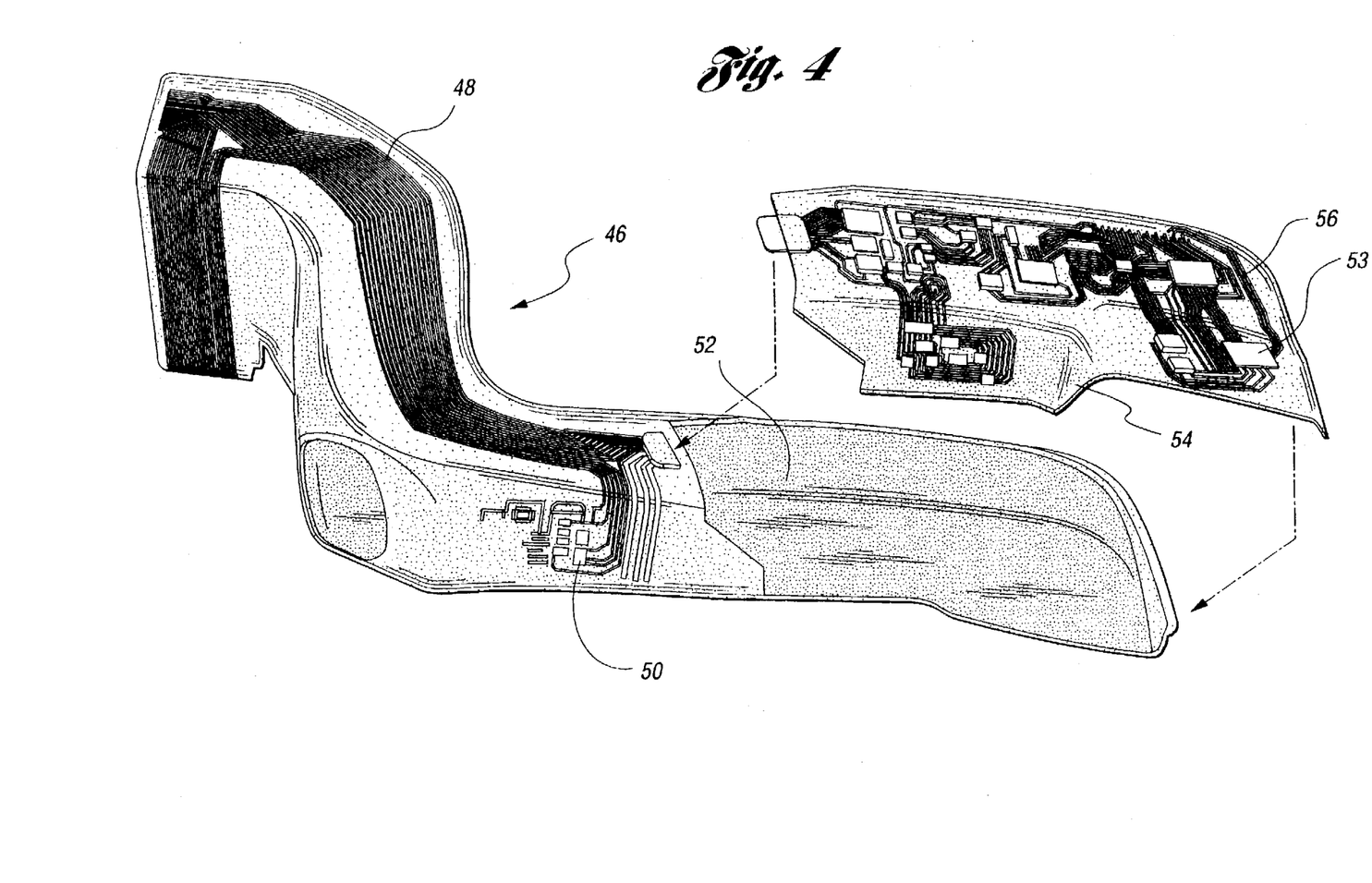
FIG. 4 shows an exploded perspective view of a ventilation duct and cover plate in accordance with the present invention.

This ventilation duct is shown more clearly in FIG. 4. As shown, the ventilation duct 46 has circuit traces 48 secured thereon and following the contour thereof, as well as electronic devices 50 which are secured to the duct 46 in electrical communication with the circuit traces 48. The ventilation duct 46 further includes an aperture 52, which is adapted to receive a cover plate 54 thereon. As shown, the cover plate 54 includes a plurality of circuit traces 56 and electronic devices 53 mounted thereon. Various fastening means, such as fastening tabs or other means, may be used for securing the Cover plate 54 within the ventilation duct aperture 52.

Features and advantages of the present invention over prior technology are listed as follows:

1. Wire harnesses and connectors are eliminated or substantially reduced;
2. Number of electronic interconnects is substantially reduced;
3. Instrument panel parts count is substantially reduced;
4. IP cost is substantially reduced;
5. IP/vehicle weight is reduced;
6. Improved space utilization;
7. Increased design flexibility and expandability in electronics architecture and packaging;
8. Circuit sharing is enabled;
9. IP assembly process is simplified;
10. The vehicle assembly process is simplified;
11. Heat sinks, housings, brackets, and fasteners are eliminated or reduced;
12. Increased instrument panel reliability and testability;
13. Simplified disassembly/serviceability;
14. Most components are recyclable using common technologies;
15. Integrated electrical interconnection features, such as electrical connectors;
16. Thermal dissipation/management is enhanced; and
17. Electromagnetic interference features are combined with instrument panel features.

Since prior art instrument panel designs combine distinct electrical systems, electronic modules, climate control systems, and the structural segments that require complex interconnection and fastening features, servicing these systems is complex, requiring considerable labor and a multitude of tools. Disassembly of such a production instrument panel for repair or recycling requires a minimum of 1.5 man hours. However, modular designed instrument panels in accordance with the present invention can be disassembled in the field with minimal tools and effort. This level of serviceability is achieved through the use of innovative fastener technologies (Nylatch® retainers, snap-fit parts, and subassemblies, rail-type modules with auto-locating electrical interconnection features, etc.), minimal interconnection points, quick release electrical interconnection features (SMD snap-fit or zero force connectors, pressure contact flex-cable interconnections, etc.), and service designed access paths (snap-release facia, and trim panels, etc.) The reduction of individual parts that require disassembly/assembly and interconnection will increase serviceability in the field and lower manufacturing cycle time. Furthermore, fewer parts and interconnections reduce NVH and "problem-not-found" warranty returns.

The functionally integrated instrument panel will increase recyclability over current instrument panel designs. Separation of materials requires fewer process steps and results in more recoverable materials than that of currently designed instrument panels. The recyclability of the new integrated modular design instrument panel is achieved using a simple two-step approach. First, the functionally integrated instrument panel plated metal content can be easily stripped by wet chemical processing and separated for reclamation. The remaining plastic, typically polypropylene, ABS, or other low cost thermoplastic, is 100% recyclable. This process results in the elimination of many conventional reclamation steps required for conventional IP circuitry and virtually eliminates re-grind fluff destined for landfill disposal. The recycled thermoplastics may be reused as high quality re-grind in structural and decorative applications within the automobile, including instrument panel structural beams and interior door and trim panels.

All of the previously discussed methods of metalizing the circuit traces onto the base substrate require material characteristics of the substrate which meet various electrical/electronic requirements. For example, electronic grade substrate materials must be able to withstand severe manufacturing environments including harsh solvent exposures and high temperature soldering processes. Some polymeric substrate materials exist with adequate thermal, chemical, and physical properties to withstand such operations. Examples of such materials include polyetherimide (PEI), polyethersulfone (PES), and liquid crystal polymers (LCP). However, these materials are often prohibitively expensive, difficult to process, and have limited design potential.

Some common engineering plastics cannot withstand the processing or operational environments encountered in electrical/electronic applications. These materials, for example, cannot withstand exposure to typical circuit processing chemicals including etchants, solvents, and plating chemicals. These resin systems, however, offer superior mechanical and design properties at a fraction of the cost of typical electronic/electrical grade materials.

Accordingly, the present invention contemplates use of known injection molding methods for fabricating a multi polymer structure having desired mechanical and electronic grade properties. Electronic grade resins are those materials capable of meeting printed wiring board manufacturing process requirements.

The areas of the multi-polymer structure containing electronic grade resin materials will be circuitized using known methods such as electroplating, or embossing and populated with electronic components. These areas will be processed according to conventional circuit board assembly manufacturing processes. The structure created will further incorporate low cost engineering thermoplastic resins as the main structural component. Within the same structure, therefore, selective areas of electronic/electrical grade resin systems may be molded to impart the properties necessary for electronic/electrical manufacturing and assembly, while other areas may be molded from low cost engineering resins to impart mechanical and design properties at a low cost. Advanced plastics processing technologies such as co-injection molding and co-extrusion make these designs possible. The finished part will have mechanical and design properties of the low cost engineering resin with the capacity for integrated electronics in one, low cost system. This integration of electronic circuitry into structural components reduces overall material costs from separate electronic/electrical and mechanical substrates, reduces overall material cost and weight, and reduces part count while increasing reliability.

The resin materials implemented in these structures must comply with two fundamental requirements. First, the materials must exhibit adequate physical, thermal, environmental, and electrical properties to meet the requirements of the intended application. Second, the materials chosen must be compatible with one another, because interfacial bonding must be maintained during processing and operation to avoid mechanical failure. Examples of resin systems that may potentially exhibit compatibility in these applications include: 1) ABS (structural) with PPO/PS (electrical); and 2) polyethylene (structural) with reinforced polypropylene (electrical), etc.

Furthermore, numerous geometric variations exist for this technology, including, for example: 1) the electronic grade resin material may form only a surface coating of the finished part, the bulk being composed of low cost engineering thermoplastic resin; 2) the electronic grade resin material may run on one or multiple sides of a three-dimensional component to allow 3-D electrical current flow; 3) the electronic grade resin material may run through the cross-section of a part to allow the incorporation of electrical through-hole technologies; and 4) the electronic grade material should be used only in areas requiring electronics to minimize cost, however, electronic grade materials may be used outside the electronics regions in order to gain other resin properties, such as dimensional stability, modulus, etc.

Figure 5:
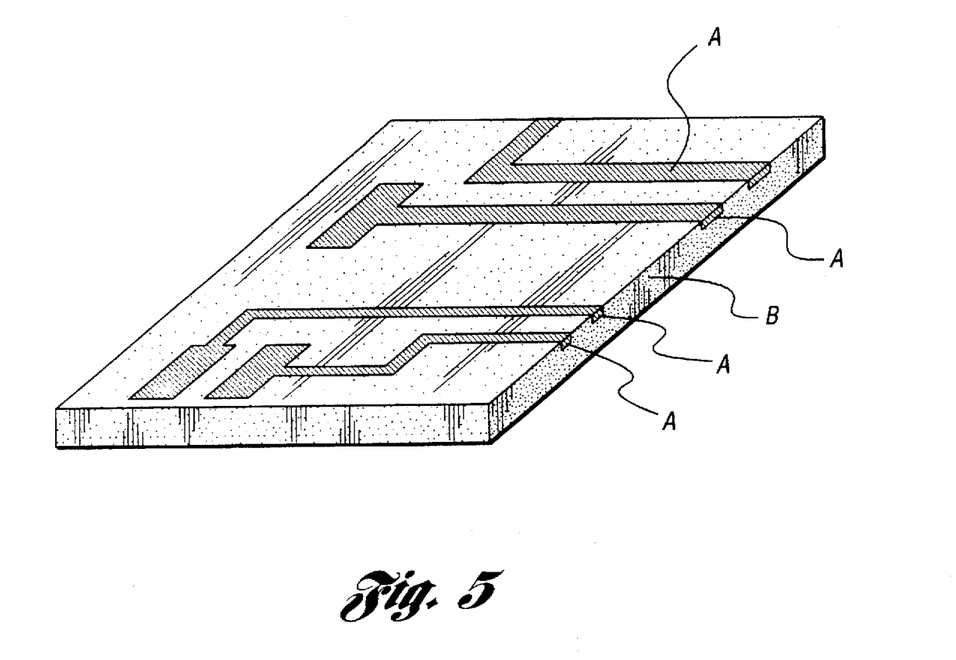
FIG. 5 shows a perspective view of an alternative cover plate embodiment in accordance with the present invention.
Figure 6:
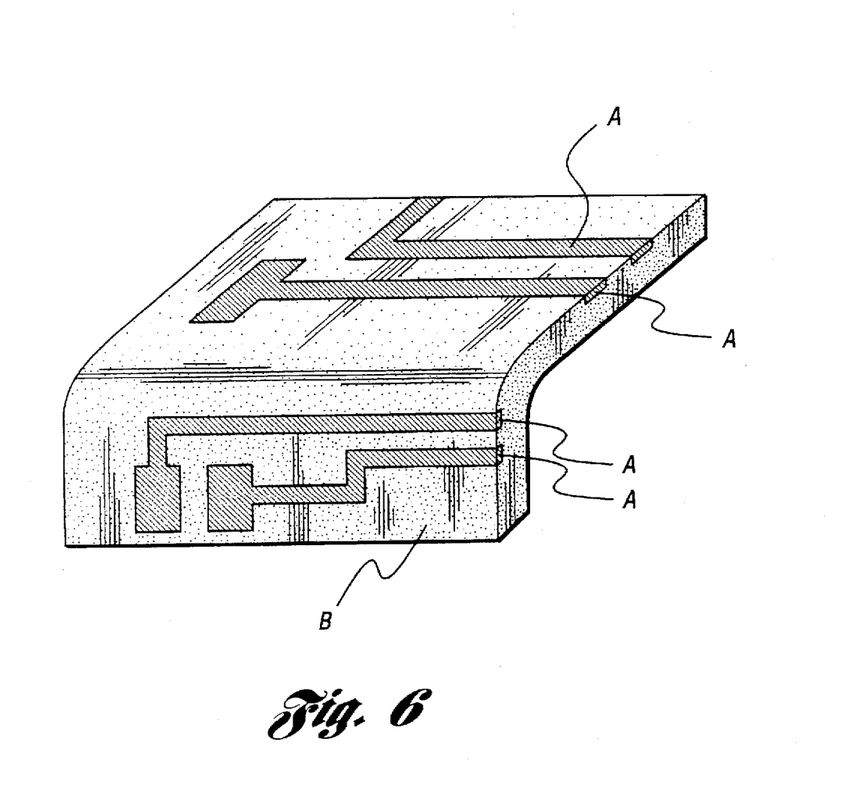
FIG. 6 shows a perspective view of yet another alternative cover plate embodiment in accordance with the present invention.
Figure 7:
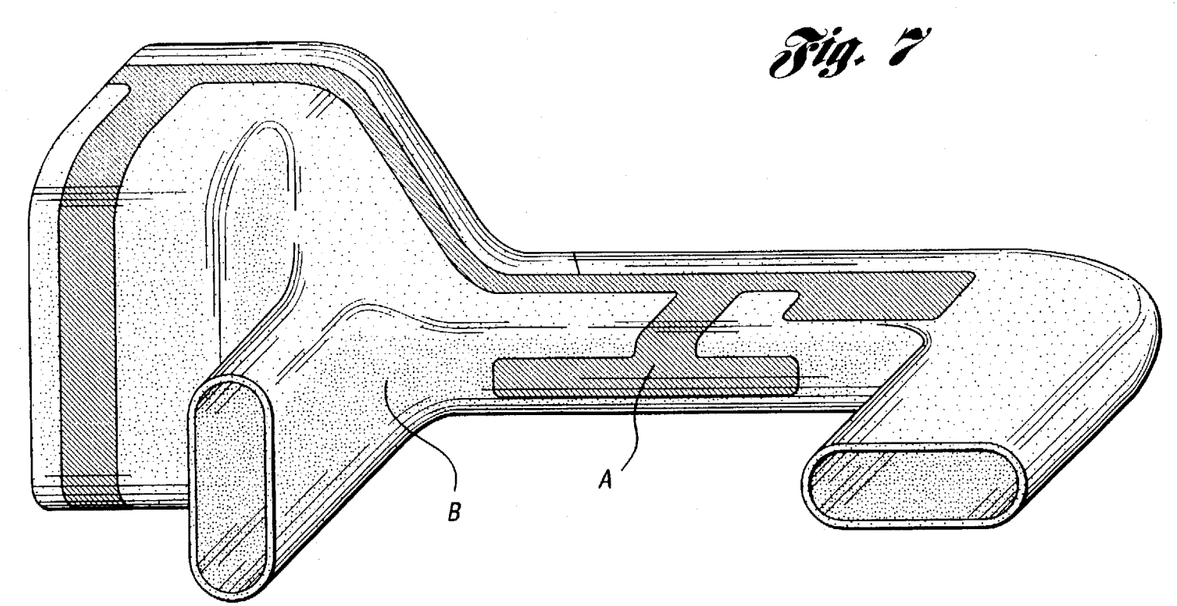
FIG. 7 shows a perspective view of an alternative ventilation duct in accordance with the present invention.

Examples of such co-injection molded substrates are shown in FIGS. 5–7. In these Figures, material identified as "A" would be electrical grade polymer, and materials designated "B" would be non-electrical grade polymer.

While the best modes for carrying out the invention has been described in detail, those familiar with the art to which this invention relates will recognize various alternative designs and embodiments for practicing the invention within the scope of the appended claims.

What is claimed is:

1. A method of assembling vehicle instrument panel structural and electronic components, comprising:

fabricating an electrically insulative molded instrument panel ventilation duct in a vehicle with means for moving air therein;

applying a conductive metalized pattern to the ventilation duct; and attaching electronic components to the ventilation duct in electrical communication with the conductive pattern.

2. The method of claim 1, wherein said step of applying a conductive pattern to the ventilation duct comprises applying a bus circuit interconnected with a plurality of circuit traces and integrated connectors.

3. The method of claim 1, wherein said step of attaching electronic components to the ventilation duct in electrical communication with the conductive pattern comprises soldering the electronic components to the conductive pattern.

4. An apparatus supporting electronic components in a vehicle, comprising:

an insulative molded vehicle ventilation duct with means for moving air therein;

a metalized conductive pattern applied directly onto the ventilation duct; and a plurality of said electronic components secured in electrical communication with the conductive pattern and supported by the ventilation duct.

5. The apparatus of claim 4, wherein said conductive pattern comprises a plurality of circuit traces interconnected with a central signal and power distribution and interconnection bus.

6. An apparatus supporting electronic components on a vehicle instrument panel, comprising:

a molded plastic vehicle instrument panel ventilation duct;

a plurality of circuit traces forming a conductive pattern metalized onto the ventilation duct; and a plurality of said electronic components secured in electrical communication with the conductive pattern and supported by the ventilation duct.

* * * * *